(12) United States Patent
Dupler et al.

(10) Patent No.: US 7,541,927 B2
(45) Date of Patent: Jun. 2, 2009

(54) WIRELESS REAL TIME LOCATION SYSTEM (RTLS) USING AUDIBLE AND/OR VISIBLE SIGNALS

(75) Inventors: Craig E. Dupler, Seattle, WA (US); Steven C. Venema, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 11/559,446

(22) Filed: Nov. 14, 2006

(65) Prior Publication Data

US 2008/0111690 A1  May 15, 2008

(51) Int. Cl.
*G08B 13/14* (2006.01)
(52) U.S. Cl. .............................. 340/572.1; 340/825.36; 340/825.49
(58) Field of Classification Search .............. 340/572.1, 340/10.1, 825.36, 825.49, 825.4, 5.92
See application file for complete search history.

(56) References Cited

U.S. PATENT DOCUMENTS

| | | | |
|---|---|---|---|
| 6,133,832 A * | 10/2000 | Winder et al. ............ 340/572.1 |
| 6,529,142 B2 | 3/2003 | Yeh et al. |
| 6,850,151 B1 * | 2/2005 | Calhoun et al. ........ 340/309.16 |
| 7,274,294 B2 * | 9/2007 | Heinze et al. ............ 340/572.1 |
| 7,375,632 B1 * | 5/2008 | Sebanc .................... 340/572.1 |
| 7,403,120 B2 * | 7/2008 | Duron et al. ............. 340/572.1 |
| 2007/0174152 A1 | 7/2007 | Bjornberg et al. |

* cited by examiner

*Primary Examiner*—Toan N Pham
(74) *Attorney, Agent, or Firm*—Weiss & Moy, P.C.

(57) ABSTRACT

A real time location system has a plurality of tag devices. Each tag device has a unique identification code. Each tag device will transmit a location signal when activated. A plurality of location receivers are installed in a fixed location. The location receivers will receive the location signal and calculate a location of the tag device transmitting the location signal. A signal mechanism is coupled to an I/O port of each tag device. The location mechanism provides at least one of an audible signal or visual signal when activated. A location reader is provided. The location reader receives the location data transmitted by the plurality of location receivers to enable a person to locate the tag device transmitting the location signal.

20 Claims, 3 Drawing Sheets

WIRELESS REAL TIME LOCATION SYSTEM (RTLS) USING AUDIBLE AND/OR VISIBLE SIGNALS

BACKGROUND OF THE INVENTION

1. Field of the Invention

This invention relates generally to a wireless location system, more specifically, to a wireless Real Time Location System (RTLS) which uses audile and/or visible signals to exactly locate a unit being tracked or located (e.g. wireless tag) in an area.

2. Background of the Invention

Determining the location of assets, such as equipment, vehicles, inventory, etc., can be important in a variety of different applications. For example, large manufacturing companies typically have warehouses which are used to store parts and inventory. It is important to accurately and timely locate parts and inventory in order to timely and successfully manufacture products. One way to track the location of assets is to use a real time location system. A real time location system will associate each asset, or group of assets, with a tag device. The tag device is capable of communicating with a controller through one or more receivers to provide information used to determine the location of the tag device and thus the location of the associated asset.

A variety of methods may be used to determine the location of the tag device. One method is by signal strength or Received Signal Strength Indication (RSSI). In this method, the tag device may send a radio frequency signal that is received by one or more antennas that communicate with a controller. Based on the signal, the controller may determine where the tag device is located. This method is generally poor in terms of accuracy and reliability, as the path loss is highly dependent on environmental conditions and affected by fading due to multi path propagation. The accuracy of the RSII method declines rapidly as either the size of the covered area increases, or the size and quantity of metal or other RF reflecting objects and surfaces in and near the covered air space increases. In indoor environments, the reliability of this method is highly dependent on the wall materials and the level of RF signal attenuation between adjacent areas.

Another method to determine the location of the tag device is to determine a time difference of arrival of a tag device signal. In this method, a tag device will encode a time stamp on a signal that is transmitted. Each controller will report on when the tag device signal is received. While this method does work, it is generally not accurate when the distance between the tag device and the controller is small. The clock devices for each tag device and controller also need to be synchronized in order to provide accurate locations. Furthermore, this method, while giving a general location of the tag device, will not provide an exact location.

Presently, all current location systems only provide location data and perhaps a display (i.e., map) in order to try and find the item being sought. Thus, the problem with present real time location systems is making the systems sufficiently accurate so that someone with the location data provided by the location system can walk right to the item being sought.

Therefore, a need exists for a system and method that overcomes the problems associated with the prior art. The system and method will provide a wireless real time location system that is sufficiently accurate so that someone with the location data provided by the location system and the proper tools can walk right to the item being sought.

SUMMARY OF THE INVENTION

A real time location system has a plurality of tag devices. Each tag device has a unique identification code. Each tag device will transmit a location signal when activated. A plurality of location receivers are installed in a fixed location. The location receivers will receive the location signal and calculate a location of the tag device transmitting the location signal. A signal mechanism is coupled to an I/O port of each tag device. The location mechanism provides at least one of an audible signal or visual signal when activated. A location reader is provided. The location reader receives the location data transmitted by the plurality of location receivers to enable a person to locate the tag device transmitting the location signal.

A method for tracking and locating tag devices comprises: installing a tag device on an asset to be located, the tag device having a unique identification code, the tag device transmitting a location signal when activated; installing location receivers in a proximity of a well defined area housing the asset; activating a desired tag device; receiving the location signal by the location receivers; locating the activated tag device by using the location receivers; and activating a signal mechanism coupled to an I/O port of the tag device, the signal mechanism providing at least one of an audible signal or visual signal when activated.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
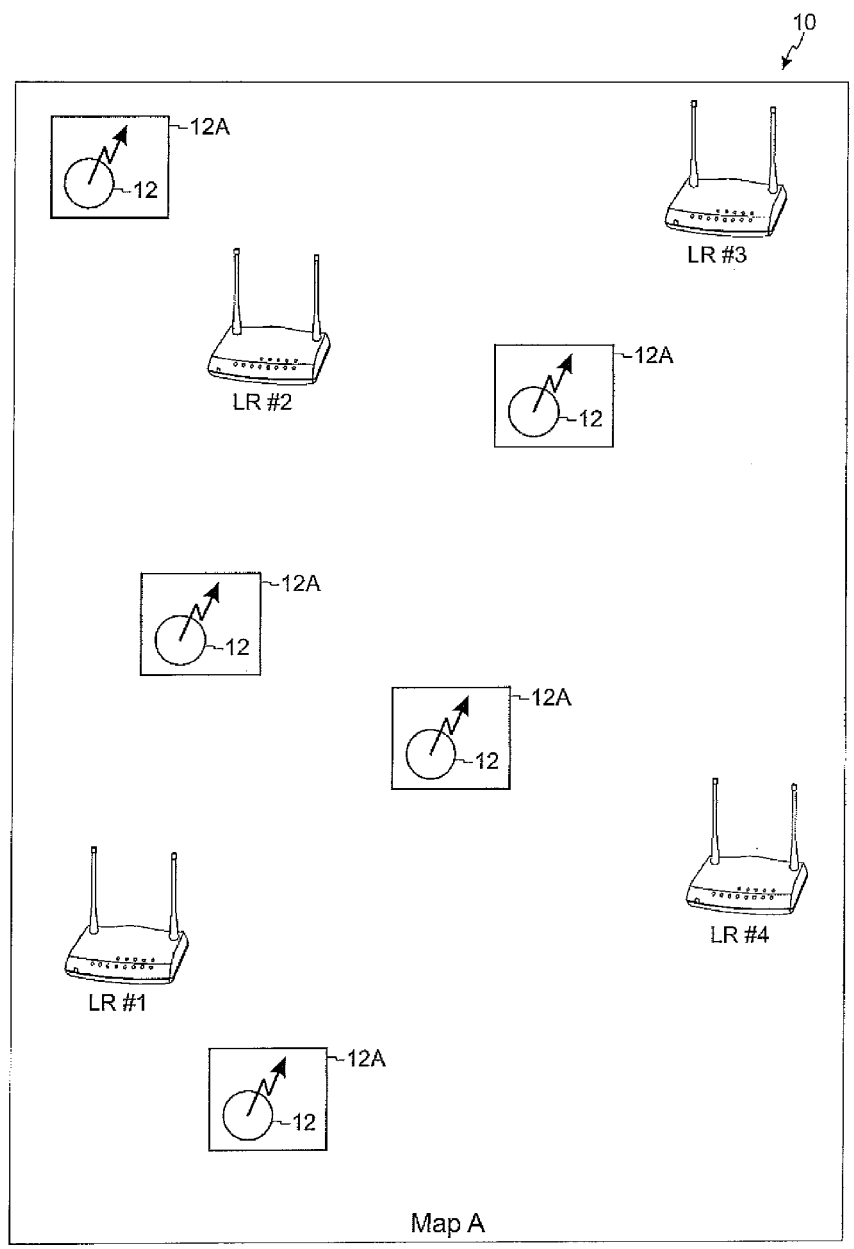
FIG. 1 is a simplified block diagram of the wireless real time location system of the present invention.
Figure 2:
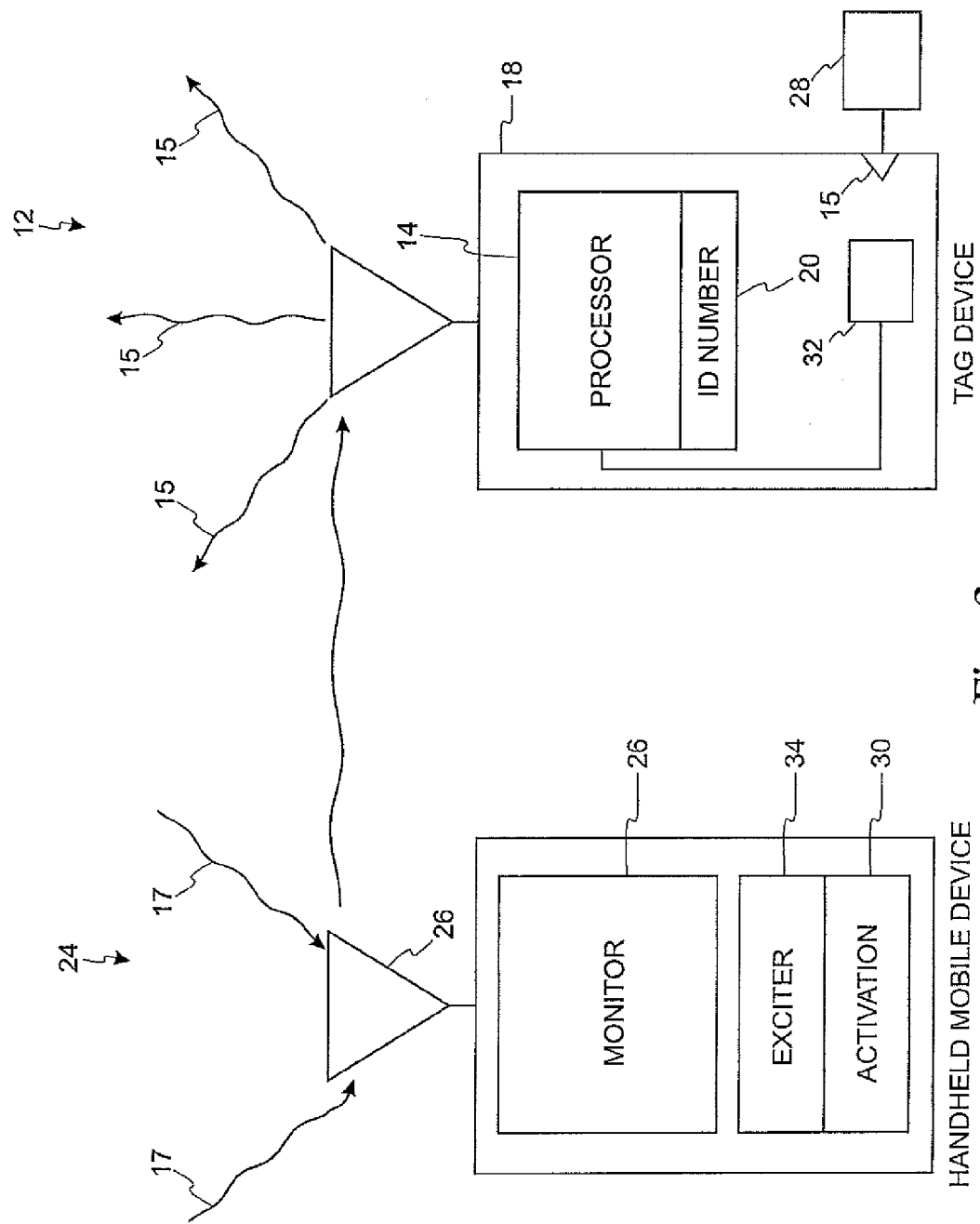
FIG. 2 is a simplified block diagram of the tag device and handheld mobile reader used in the wireless real time location system of the present invention.

Referring to FIGS. 1 and 2, a wireless location system 10 is installed in an area defined as Map A. The area Map A may be any type of open or closed area. In the present embodiment, the system 10 will be described in a warehouse setting wherein the system 10 is used to track the location of assets/parts 12A. However, this should not be seen as to limit the scope of the present invention. The system 10 may be installed in any area where items need to be located.

The system 10 will install a plurality of tag devices 12. Each tag device 12 is attached on each asset 12A, or group of assets that needs to be monitored/located. In the embodiment depicted in FIG. 1, five tag devices 12 are shown. However, this should not be seen as to limit the scope of the present invention. The number of tag devices 12 will be dictated by the number of items need to be located.

As shown in FIG. 2, each tag device 12 is an electronic device that containing a microprocessor 14 combined with an antenna 16 housed in a compact package 18. The packaging 18 is structured to allow each tag device 12 to be attached to the asset 12A to be tracked/monitored. Each microprocessor 14 of each tag device 12 will be encoded with a unique ID 20. In order to locate a particular asset, the tag device 12 attached to the specific asset 12A will be activated. Once the tag device 12 is activated, the tag device 12 will transmit a location signal 15 encoded with the unique ID 20.

A plurality of location receivers LR#1-LR#4 is installed in the area defined as Map A. In the embodiment depicted in FIG. 1, four location receivers LR#1-LR#4 are shown. However, this should not be seen as to limit the scope of the present invention. The number of location receivers LR#1-LR#4 is generally dictated by the size of the area defined as Map A and the strength and range of each location receivers LR#1-LR#4.

The location receivers LR#1-LR#4 are placed in fixed locations in the area defined as Map A. The location receivers LR#1-LR#4 are used to locate the activated tag device 12. If the activated tag device 12 is in a range of one or more of the location receivers LR#1-LR#4, the in range location receivers LR#1-LR#4 will receive the encoded location signal 15 sent by the activated tag device 12. The in range location receivers LR#1-LR#4 will then determine the location of the activated tag device 12. The location method used to locate the activated tag 12 may be any commonly used wireless location method.

A handheld mobile location viewer 24 (hereinafter location reader 24) that includes an antenna 26 will receive location data signals 17 transmitted by the in range location receivers LR#1-LR#4. The location reader 24 will direct a person to the asset having the activated tag device 12. The location reader 24 may further have a monitor 26. The monitor 26 will give visual data to further help a person locate the asset having the activated tag device 12.

Using the location data signals 17 transmitted by the in range location receivers LR#1-LR#4 will allow a person using the location reader 24 to only get in a general vicinity of the asset having the activated tag device 12. Locations methods such as RSSI, TOA, TDOA generally are only accurate to within 30-60 feet. If the size of the area defined as Map A is a large warehouse, a person would still have to spend a good amount of time to locate the asset having the activated tag device 12. This is especially true in a warehouse setting where assets may be stacked on top of one another ten to fifteen feet or more in the air.

For this reason, each tag device 12 will have a signal mechanism 28 coupled to an I/O port 15 of the tag device 12. The signal mechanism 28 will provide an audible and/or visual signal when activated to further enable the person to locate the asset having the activated tag device 12. The signal mechanism 28 may be a light device that will illuminate and/or flash when activated and/or an audible device which will transmit an audible signal such as a beeping sound or the like when activated. When illuminated/flashing and/or beeping, the signal mechanism 28 will allow the party to find the exact location of the tag device 12.

Once the location receivers LR#1-LR#4 direct a person using the location reader 24 to the general vicinity of the asset having the activated tag device 12, a user may activate the location mechanism 28 on the activated tag device 12. In accordance with one embodiment of the present invention, the location reader 24 will have an activation unit 30. The activation unit 30 is used to activate the location mechanism 28 on the activated tag device 12. While the tag device 12 may be a passive tag device, in order to provide more reliability and sufficient power for the tag device 12 to power the location reader 24, the tag device 12 will generally be an active tag device 12 having an internal power supply 32.

An excitation unit 34 is generally used to activate a tag device 12 to locate a specific asset. The excitation unit 34 may be a stand alone unit or installed as part of one or more of the location receivers LR#1-LR#4. Alternatively, the excitation unit 34 may be installed in the location reader 24. In this embodiment, the location reader 24 will transmit an activation signal of a desired tag 12 in order to locate a specific asset. The antenna 16 of the specific tag device 12 will pick up the activation signal from the location reader 24 and then transmit location signals 15 encoded with the ID number. The location receivers LR#1-LR#4 will use the location signals encoded with the ID number to locate the activated tag device 12.

Figure 3:
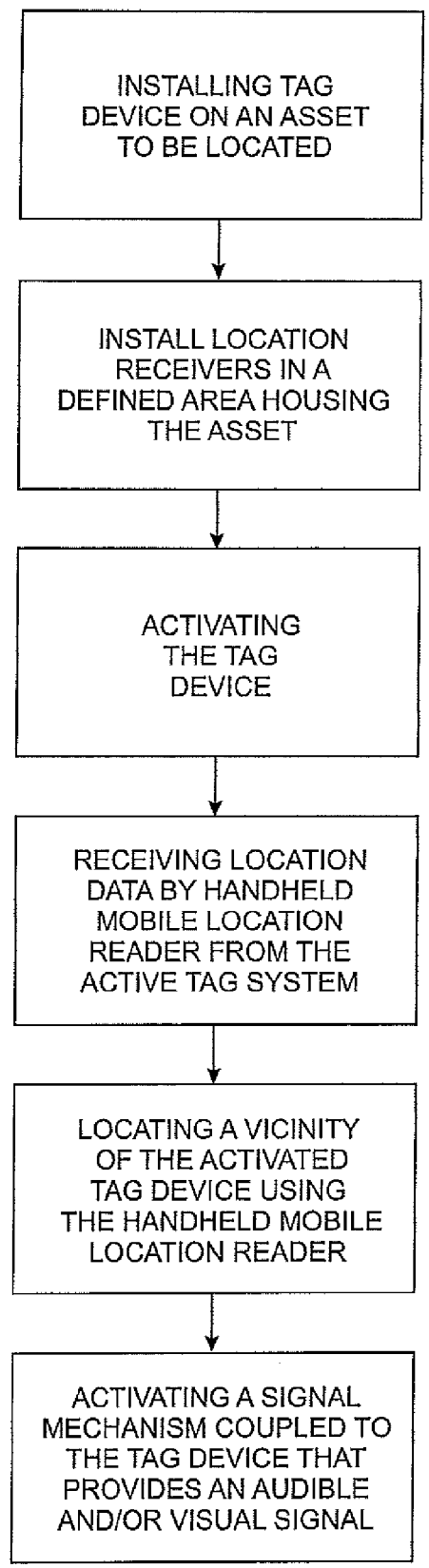
FIG. 3 is a flowchart depicting a method for a wireless real time location system to accurately locate an item.

Referring to FIGS. 1-3, the operation of the system 10 will be disclosed in further detail. When a specific asset is to be located, the tag device 12 associated with the specific asset is activated. The excitation unit 34 is used to activate the tag device 12 associated with the specific asset. The excitation unit 34 will transmit an activation signal to activate the desired tag 12. The antenna 16 of the specific tag device 12 will pick up the activation signal from the location reader 24 and then transmit location signals encoded with the ID number.

The location receivers LR#1-LR#4 may use any type of location method to locate the activated tag 12. The location receivers LR#1-LR#4 may use RDF, RSSI, TDOA or any other commonly used wireless location methods and combinations thereof.

The location reader 24 that includes an antenna 26 will receive the location data transmitted by the location receivers LR#1-LR#4. In accordance with one embodiment of the present invention, the antenna 26 is both an omni and directional antenna. A user will generally set the antenna 26 on the location reader 24 to omni mode for maximum range. In omni mode, the antenna 26 will receive data in all directions. As one gets closer to the specific asset, the user may switch the antenna 26 on the location reader 24 to directional mode. In the directional mode, the location reader 24 will search for the strongest signal in a particular direction. The user will generally move the location reader 24 in different directions looking for the strongest signal. Once the direction of the strongest signal is determined, the user will walk in the direction of the strongest signal while monitoring readings from the location reader 24.

The location reader 24 will direct the person to the general vicinity of the asset having the activated tag device 12. Once in the general vicinity of the asset, the user will activate the location mechanism 28 on the activated tag device 12. The location mechanism 28 will provide an audible and/or visual signal when activated to enable the person to locate the asset having the activated tag device 12.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A real time location system comprising:
   a plurality of tag devices, wherein each tag device has a unique identification code, each tag device transmitting a location signal when activated;
   a plurality of location receivers installed in a defined area housing the plurality of tag devices, wherein at least one location receiver in range of an activated tag device receives the location signal and calculates a location of the tag device transmitting the location signal;

a signal mechanism coupled to an I/O port of each tag device, the signal mechanism providing at least one of an audible signal or visual signal when activated; and a handheld location reader receives location data transmitted by the at least one location receiver in range of the activated tag device.

2. The real time location system in accordance with claim 1 further comprising an excitation unit for transmitting an activation signal to a specified tag device.

3. The real time location system in accordance with claim 2 wherein the excitation unit is incorporated in the location reader.

4. The real time location system in accordance with claim 1 further comprising an activation unit for transmitting a signal mechanism activation signal to activate that at least one of an audible signal or visual signal.

5. The real time location system in accordance with claim 4 wherein the activation unit is incorporated in the location reader.

6. The real time location system in accordance with claim 1 wherein each tag devices comprises:

a processor, wherein the processor is encoded with the identification code; and an antenna coupled to the processor for transmitting the location signal.

7. The real time location system in accordance with claim 6 wherein each tag devices further comprises a power supply.

8. The real time location system in accordance with claim 1 wherein the location receivers use one of RSSI or TDOA to locate the tag device.

9. The real time location system in accordance with claim 1 wherein the signal mechanism is a light device which illuminates when activated.

10. The real time location system in accordance with claim 1 wherein the signal mechanism is a sound device which transmits an audible signal when activated.

11. The real time location system in accordance with claim 1 wherein the activated tag is activated by an activation signal transmitted by at least one location receiver.

12. A real time location system comprising:

a plurality of tag devices, wherein each tag device has a unique identification code, each tag device transmitting a location signal when activated;

a plurality of location receivers installed in a defined area housing the plurality of tag devices, wherein at least one location receiver in range of an activated tag device receives the location signal and calculates a location of the activated tag device transmitting the location signal;

a signal mechanism coupled to an I/O port of each tag device, the signal mechanism providing at least one of an audible signal or visual signal when activated;

a location reader which receives location data transmitted by the at least one location receiver in range of the activated tag device;

an excitation unit for transmitting an activation signal to a specified tag device, wherein the excitation unit is incorporated in the location reader; and an activation unit for transmitting a signal mechanism activation signal, wherein the activation unit is incorporated in the location reader.

13. The real time location system in accordance with claim 12 wherein each tag devices comprises:

a processor, wherein the processor is encoded with the identification code;

an antenna coupled to the processor for transmitting the location signal; and a power supply coupled to the processor.

14. The real time location system in accordance with claim 12 wherein the location receivers use one of RSSI, or TDOA to locate the tag device.

15. The real time location system in accordance with claim 12 wherein the signal mechanism is a light device which illuminates when activated.

16. The real time location system in accordance with claim 12 wherein the signal mechanism is a sound device which transmits an audible message when activated.

17. A method for tracking and locating tag devices comprising:

installing a tag device on an asset to be located, the tag device having a unique identification code, the tag device transmitting a location signal when activated;

installing location receivers in fixed locations in an area housing the asset;

activating the tag device;

receiving the location signal by the location receivers;

locating a general vicinity of the activated tag device by using the location receivers; and activating a signal mechanism coupled to an I/O port of the tag device, the signal mechanism providing at least one of an audible signal or visual signal when activated.

18. The method of claim 17 further comprising transmitting location data of the tag device by the location receivers to a location reader.

19. The method of claim 18 further comprising transmitting an activation signal from the location reader to activate the tag device.

20. The method of claim 18 further comprising transmitting a signal mechanism activation signal from the location reader to activate the signal mechanism.

* * * * *